United States Patent [19]

Torres

[11] 3,962,472

[45] June 8, 1976

[54] METHOD OF INHIBITION OF WARMED-OVER FLAVOR IN UNCURED MEATS

[75] Inventor: Anibal Torres, Waterford, Conn.

[73] Assignee: Pfizer Inc., New York, N.Y.

[22] Filed: June 26, 1975

[21] Appl. No.: 590,599

[52] U.S. Cl. .............................. 426/281; 426/327; 426/332; 426/538; 426/652
[51] Int. Cl.² ...................... A23L 1/31; A23L 1/22; A23B 4/14
[58] Field of Search .......... 426/281, 327, 332, 538, 426/652; 260/586 R

[56] References Cited
UNITED STATES PATENTS

| | | |
|---|---|---|
| 2,865,962 | 12/1958 | Krimen et al. .................. 260/586 R |
| 3,780,192 | 12/1973 | Danner et al. .................. 426/332 X |
| 3,810,998 | 5/1974 | Sato et al. ........................ 426/332 |
| 3,821,444 | 6/1974 | Sato et al. ........................ 426/332 |

*Primary Examiner*—James R. Hoffman
*Attorney, Agent, or Firm*—Connolly and Hutz

[57] ABSTRACT

3-(lower alkyl)-1,2-cyclopentanediones and 3,5-di-(lower alkyl)-1,2-cyclopentanediones when used at low levels in uncured meats provide an improved method of inhibition of warmed-over flavor in said meats.

14 Claims, No Drawings

METHOD OF INHIBITION OF WARMED-OVER FLAVOR IN UNCURED MEATS

BACKGROUND

1. Field of the Invention

The invention is based on the discovery that 3-(lower alkyl)-1,2-cyclopentanediones and 3,5-di-(lower alkyl)-1,2-cyclopentanediones when incorporated in uncured meats at low levels inhibit the development of warmed-over flavor in said meat without imparting any uncharacteristic flavor or odor.

DESCRIPTION OF THE PRIOR ART

The development of warmed-over flavor in cooked, uncured meats after storing in a cool place is well known. While meats which develop this characteristic warmed-over flavor retain the nutritive value of freshly cooked meats, they are substantially less palatable to the consumer and, consequently, are often not completely utilized. Warmed-over flavor does not develop in raw meat, but appears to start its development after uncured meat is cooked and allowed to cool.

Sato and Hegarty in U.S. Pat. Nos. 3,810,998 and 3,821,444 state that warmed-over flavor appears to develop best at refrigeration temperatures of about $-1°$ to 10°C., and particularly at about 3.3°C. which is in the range of normal refrigeration temperatures. Warmed-over flavor can be detected after about 20–30 minutes of such storage, and becomes well developed in 3 to 4 hours. Beef is especially affected by warmed-over flavor; however, pork, veal, lamb and poultry meats, such as turkey and chicken, are also very much affected. I have also found fish meat to be affected in a similar manner.

It is well known in the art that warmed-over flavor does not develop in the case of cured meats. By "cured meats" we mean meats that have been treated with curing agents such as nitrites and nitrates and high concentrations of salts such as sodium chloride and the polyphosphates. However, in using the term "uncured meats" we do not wish to exclude those meats which have been salted to taste or contain less than about 3 percent of salt, as such meats are capable of developing warmed-over flavor. I exclude only those meats which have been subjected to curing treatments using salts such as nitrites and nitrates at levels of the order of about 0.5 to 1 percent by weight, and which would be sold as cured products, or salts such as sodium chloride and the phosphates at levels greater than about 3 percent by weight, and which would be sold as cured products.

The above-mentioned U.S. Pat. No. 3,810,998 discloses a method for inhibiting warmed-over flavor in uncured cooked meats by incorporating 2,3-dihydroxy-2-cyclopenten-1-one (reductic acid) in the uncured meat at levels of 0.05 to 2 percent (500 to 20,000 ppm.) based on the weight of meat. U.S. Pat. No. 3,821,444 similarly discloses the use of γ-pyrones having a hydroxyl group at the 3rd or 5th position for inhibiting warmed-over flavor. The latter agents are also incorporated in the meat at levels of 500 to 20,000 ppm. based on the weight of meat. However, reductic acid and the above-mentioned γ-pyrones, when employed at the relatively high levels indicated above to prevent warmed-over flavor in meats, also impart uncharacteristic flavor and aroma qualities that give the meat an unnatural and, therefore, undesirable flavor.

The inhibition of warmed-over flavor in cooked meats is also discussed in Sato et al., J. Food Sci., 38, 398–403 (1973) and in references given therein. In the latter reference, the authors also disclose maltol, reductic acid and other even less effective adjuncts such as dihydroxymaleic acid and pyrazine.

SUMMARY

Accordingly, the present invention provides a novel and effective method for inhibiting the development of the warmed-over flavor in uncured meats which comprises adding to the uncured meat from about 25 to 250 parts by weight per million parts by weight of meat of a compound of formula (I):

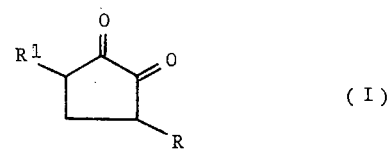

wherein R is selected from the group consisting of methyl and ethyl; and $R^1$ is selected from the group consisting of hydrogen, methyl and ethyl.

Within the scope of the invention said compound of formula (I) may be added to the meat in undiluted form or diluted with a solid or liquid diluent; said compound may be incorporated into the meat before cooking or after cooking, but prior to cooling the meat to a temperature below about 10°C. Additionally, when uncured, cooked meat treated with said compound of formula (I) is stored at temperatures below the freezing point of the meat, warmed-over flavor is inhibited for periods of up to four weeks or longer.

Rewarmed meats when treated according to the method of the invention have none of the characteristic warmed-over flavor and are free of uncharacteristic flavor and aroma; they are therefore of superior taste quality when compared to meats treated by the prior art methods.

DETAILED DESCRIPTION OF THE INVENTION

The above-mentioned prior art methods for inhibiting warmed-over flavor in uncured cooked meats, U.S. Pat. No. 3,810,998; U.S. Pat. No. 3,821,444 and J. Food Sci., 38, 398–403 (1973), have been found to be lacking in at least two crucial parameters. Firstly, for effective inhibition of warmed-over flavors they require that the adjuncts used be employed at relatively high levels in the range of 0.05 to 2 percent by weight. Secondly, the adjuncts which are disclosed as being effective in this use are reductic acid and γ-pyrones having an hydroxyl group at the third or fifth position in the γ-pyrone ring. Specific γ-pyrones disclosed are 3-hydroxy-2-methyl-4-pyrone (maltol), 3-hydroxy-4-ethyl-4-pyrone (ethyl maltol), and 5-hydroxy-2-hydroxymethyl-4-pyrone (kojic acid). When maltol is employed at these levels it imparts to the meat a characteristic sweet odor and flavor suggestive of marshmallow. Whereas this type of flavor is desirable in certain normally-sweetened foods, such as chocolate or strawberry-flavored foods, it is not characteristic of meat and seriously detracts from the palatability of the meat. Likewise, ethyl maltol imparts an atypical flavor to the meat which may be described as a sweet, "cotton-candy" flavor. This is an agreement with previous descriptions of the flavoring effects of maltol and ethylmaltol in "Food Chemicals Codex," Second Edition, National Academy of Sciences, Washington, D.C., 1972, p. 294 and p. 487, and in U.S. Pat. Nos. 3,376,317; 3,440,183 and 3,446,629.

Reductic acid and kojic acid also impart undesirable flavor qualities to meat when they are utilized at levels of 500 ppm. (0.05%) or greater. With these compounds, however, the meat is found to have bitter-acidic or bitter-astringent flavors which are definitely not compatible with typical meat flavors.

However, the compounds of formula (I)

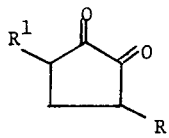

wherein R is selected from the group consisting of methyl and ethyl; and $R^1$ is selected from the group consisting of hydrogen, methyl and ethyl; when used in the method of the present invention at levels in the range of 25 to 250 ppm. by weight, are equally as effective in inhibiting warmed-over flavor as the above-described prior art compounds when the latter are used at levels 2-800 times as high. In addition, the method of the invention provides meats which closely resemble typical, freshly-cooked meats without adjuncts. Indeed, any flavor qualities imparted by the instant method are nut-like qualities which enhance the meat flavor.

Descriptions of the flavor quality and potency of 2-methyl-1,2-cyclopentanedione and the corresponding 3-ethyl compound are set forth in U.S. Pat. No. 3,376,317; U.S. Pat. Nos. 3,440,183 and 3,446,629 and references therein. The preparation and properties of 3,5-dimethyl-1,2-cyclopentanedione and 3,5-diethyl-1,2-cyclopentanedione are disclosed in U.S. Pat. No. 3,843,704 and U.S. Pat. No. 3,873,622.

In carrying out the present invention for inhibiting warmed-over flavor in uncured meats, the said compounds of formula (I) may be incorporated in the meat at the prescribed levels either before the meat is cooked or after the meat is cooked, but prior to the cooling below temperatures of about 10°C. If the meat is allowed to cool below 10°C. for periods greater than about 20 minutes, warmed-over flavor commences to develop in the untreated meat. The compounds of formula (I) may be added to the meat in the form of a pure solid, undiluted liquid or melt. Alternatively, they can be diluted with either solid or liquid diluents. Examples of suitable solid diluents which may be employed are flour, starch, corn meal, bread crumbs, soya protein, sodium chloride and the like, as well as mixtures thereof. Liquid diluents employed are those that are non-toxic and do not impart any undesirable properties to the meat such as incompatible taste or aroma, and also serve to dissolve or disperse said compounds of formula (I). Examples of suitable liquid diluents are water, ethyl alcohol, edible oils and fats, propyleneglycol and the like, as well as mixtures thereof. Preferred liquid diluents are water, ethanol and mixtures thereof.

In the case where the adjuncts of formula (I), wherein R and $R^1$ are as previously defined, are added to the meat before cooking, the adjunct in diluted or undiluted form is incorporated into the meat; for example, fresh ground beef, the beef is then cooked in one piece or divided into smaller units such as patties. The cooked meat may then be cooled, stored at refrigerator temperatures, and then taken out and consumed cold or reheated, for example, to temperatures in the range of about 32° to 70°C., and then consumed. Benefit through avoidance of development of warmed-over flavor is obtained when the cooked meat is stored more than about 20 minutes, with greater benefit being obtained when such storage is several hours or more at normal refrigerator temperatures. Further, the meat is to which the above-described compound of formula (I) has been added may be repeatedly stored and reheated while still avoiding the warmed-over flavor.

It has also been found that cooked, uncured meats containing said compound of formula (I) may be stored for even longer periods, when in a frozen condition, without development of warmed-over flavor. When stored in a frozen state for periods of up to four weeks or more, the rewarmed meat is devoid of warmed-over flavor and tastes quite similar to its freshly cooked counterpart.

With meats that are to be divided into smaller units for cooking, such as patties, meat balls, or small chunks or strips for use in stews and casseroles, it is advantageous to add the adjuncts of formula (I) to the meat prior to its division into such small units. Thus, for example, it is preferred to add the adjunct to ground meat before it is divided into patties.

In those cases where the meat is to be cooked in a body or large chunk such as a turkey or a beef roast, the compound of formula (I), wherein R and $R^1$ are as previously defined, is most conveniently administered in the form of a solution, and preferably a solution in water or aqueous ethanol. The solution may be conveniently injected into the meat with a syringe. The adjuncts may also be applied to the outer surface of the meat, in which case the compounds of formula (I) may be in either the undiluted or diluted form.

In practicing the improved method of the invention it is preferred to add the compounds of formula (I), wherein R and $R^1$ are as described above, to raw meat because it is easier to get good distribution of the adjunct in this way. However, it is believed that the adjunct has no effect on warmed-over flavor development until the meat has been cooked and cooled. This is borne out by the observation that the adjuncts of formula (I) when added to the meat after cooking but prior to onset of warmed-over flavor, also prevent the development of warmed-over flavor.

After the meat treated by the method of the invention has been cooked and the cooked meat allowed to cool for a period of say from 20 minutes or longer--any time up to the time of bacterial spoilage of the meat---and consumed cold, or reheated, the warmed-over flavor will have been prevented or, at least, very substantially inhibited. By cooling the cooked meat I mean that we are reducing its temperature substantially below the cooking temperature, preferably below about 10°C. Warmed-over flavor does not normally develop while the meat is held at or near the temperature at which it is cooked, but once the factors which produce warmed-over flavor are developed, they are not destroyed by heating even to cooking temperatures.

The method of the invention is also applicable to uncured meats which are cooked and then eventually frozen and maintained in the frozen state until they are rewarmed just prior to consumption. In many of these frozen meats which have not been treated, warmed-over flavor often develops since the meat remains at temperatures at which warmed-over flavor is produced for a sufficient time (20 minutes or more) prior to attaining freezing temperature.

The following examples are illustrative of the method of the invention.

EXAMPLE 1

Fresh ground beef (chuck blade roast) was used to investigate the effects of 3-ethyl-1,2-cyclopentandione (ECP) and 3-methyl-1,2-cyclopentanedione (MCP) on warmed-over flavor (WOF). One percent solutions (1.00 g. per 100 ml.) of each of the adjuncts were prepared in 5% ethanol as solvent (5 ml. ethanol plus 95 ml. water).

The ground beef was divided into four 500 gram portions, to three of the portions were then added:
1. 5 ml. of 1% ECP in 5% ethanol
2. 5 ml. of 1% MCP in 5% ethanol
3. 5 ml. of 5% ethanol (solvent blank).

The solutions were thoroughly mixed into the meat and the resulting samples were made into 25 g. patties. The untreated 500 g. portion of ground beef was likewise divided into 25 g. patties. All patties were then cooked in the same manner on a grill maintained at 232°C. (450°F.) for 3 minutes on each side. The patties were then allowed to cool to room temperature, wrapped in aluminum foil and placed in the refrigerator at 4°C. overnight. The following day the patties were recooked at 232°C. (450°F.) for 3 minutes on each side and evaluated for relative flavor by an experienced taste panel. The results obtained are tabulated below:

| Adjunct | Flavor Evaluation |
|---|---|
| None (control) | Pronounced warmed-over flavor (WOF). |
| 100 ppm. 3-ethyl-1,2-cyclopentanedione (ECP) | No WOF, freshly cooked meat flavor with peceptible toasted flavor note quite compatible with beef. |
| 100 ppm. 3-methyl-1,2-cyclopentanedione (MCP) | No WOF, but slight nut-like flavor quite compatible with beef. |
| Solvent Blank | Pronounced WOF. |

When the above procedure is repeated, but using 3,5-diethyl-1,2-cyclopentanedione (DECP) and 3,5-dimethyl-1,2-cyclopentanedione (DMCP) in place of 3-ethyl-1,2-cyclopentanedione and 3-methylcyclopentanedione the results are as follows:

| Adjunct | Flavor Evaluation |
|---|---|
| None (control) | Pronounced WOF. |
| 100 ppm. DECP | No WOF, freshly cooked meat flavor, no off-flavor notes. |
| 100 ppm. DMCP | No WOF, freshly cooked meat flavor, with some nut-like quality. |
| Solvent Blank | Pronounced WOF. |

EXAMPLE 2

When the procedure of Example 1 is repeated but using the adjuncts maltol, ethyl maltol, kojic acid and reductic acid at 500 parts by weight per million parts by weight of meat (0.05 percent) results are as follows:

| Adjunct | Flavor Evaluation |
|---|---|
| None (control) | Pronounced WOF |
| 500 ppm. Maltol | No WOF but pronounced "marshmallow" aroma and taste not compatible with meat. |
| 500 ppm. Ethyl maltol | No WOF but pronounced "cotton candy" aroma and taste not complementary to meat flavor. |
| 500 ppm. Kojic acid | Trace WOF, undesirable bitter, acidic flavor noted which is not compatible with meat flavor. |
| 500 ppm. Reductic acid | Trace WOF, undesirable bitter, astringent taste. |

EXAMPLE 3

The procedure of Example 1 was repeated except that the cooked patties, after cooling to room temperature, were stored at −22°C. Samples were removed from the freezer at intervals of 1 week, 2 weeks and 4 weeks, recooked and evaluated for relative flavor quality. Results were as follows:

| Adjunct | 1 week | Flavor Evaluation 2 weeks | 4 weeks |
|---|---|---|---|
| None (control) | WOF | WOF | Pronounced WOF. rancid odor and taste |
| 100 ppm. ECP | No WOF, some toasted flavor, judged good | Same as at 1 week | Same as at 1 week |
| 100 ppm. MCP | No WOF, nut-like flavor, judged good | Same as at 1 week | Same as at 1 week |
| Solvent Blank | WOF | WOF | Pronounced WOF. rancid odor and taste. |

EXAMPLE 4

When the procedure of Example 3 is repeated with maltol, ethyl maltol, kojic acid and reductic acid, each adjunct being added to the meat at 500 ppm., the results are as follows:

| Adjunct | 1 week | Flavor Evaluation 2 weeks | 4 weeks |
|---|---|---|---|
| None (control) | WOF | WOF | WOF |
| 500 ppm. Maltol | No WOF, but pronounced "marshmallow" aroma and taste not compatible with meat | Same as at 1 week | Same as at 1 week |
| 500 ppm. Ethyl-maltol | No WOF, but pronounced "cotton-candy" aroma and taste, not complementary to meat flavor | Same as at 1 week | Same as at 1 week |
| 500 ppm. Kojic acid | Trace WOF, undesirable | Same as at 1 week | Slight WOF, otherwise same |

-continued

| Adjunct | 1 week | Flavor Evaluation 2 weeks | 4 weeks |
|---|---|---|---|
| | bitter, acidic flavor not compatible with meat flavor | | as at 1 week |
| 500 ppm. Reductic acid | Trace WOF, undesirable bitter, astringent taste | Same as at 1 week | Same as at 1 week |

EXAMPLE 5

The procedure of Example 1 was repeated with seasoned ground pork in place of beef. The patties were cooked on a grill maintained at 232°C. for 5 minutes on each side, then treated as described in Example 1. Results were as follows:

| Adjunct | Flavor Evaluation |
|---|---|
| None (control) | WOF |
| 100 ppm. ECP | No WOF, slight toasted flavor which complemented the pork flavor. |
| 100 ppm. MCP | No WOF, slight nut-like odor and taste which complemented the pork flavor. |
| Solvent Blank | WOF |

When ground veal or ground lamb is used in place of ground pork in the above procedure the results are substantially the same.

When DECP and DMCP at 100 ppm. each are used in place of ECP and MCP in the above procedure no warmed-over flavor or incompatible flavor notes are detected upon rewarming the meat patties.

EXAMPLE 6

The procedure of Example 3 was repeated, but using seasoned ground pork in place of ground beef, and cooking the patties at the same temperature for 5 minutes per side, the results were as follows:

| Adjunct | 1 week | Flavor Evaluation 2 weeks | 4 weeks |
|---|---|---|---|
| None (control) | WOF | WOF | WOF, slightly rancid |
| 100 ppm. ECP | No WOF, some toasted flavor judged good | Same as 1 week | Same as 1 week |
| 100 ppm. MCP | No WOF, slight nut-like flavor quality | Same as 1 week | Same as 1 week |
| Solvent Blank | judged good WOF | WOF | Pronounced WOF, stale |

EXAMPLE 7

When the procedures of Example 5 and Example 6 are repeated but using maltol, ethyl maltol, kojic acid and reductic acid each at a level of 500 ppm., the results obtained using the procedure of Example 5 are the same as noted in Example 2. The results obtained by the procedure of Example 6 do not differ substantially from those noted in Example 4.

EXAMPLE 8

In the procedure of Example 1 the adjuncts, ECP and MCP, are added to the ground beef at a level of 100 parts by weight of adjunct per million parts by weight of meat. When this procedure is repeated but using each of the adjuncts at levels of 25, 50, 250, 350 and 500 ppm., on the same weight basis, the results obtained upon evaluation of the flavor obtained in each case are tabulated below.

| Level, ppm. | Adjunct ECP | MCP | None (control) | Solvent Blank |
|---|---|---|---|---|
| 25 | Some WOF, but better than control | Some WOF, but better than control | WOF | WOF |
| 50 | No WOF, slight toasted flavor | No WOF, trace of nutty flavor | WOF | WOF |
| 150 | No WOF, slight toasted flavor | No WOF, slight nutty flavor | WOF | WOF |
| 250 | No WOF, toasted flavor | No WOF nutty flavor | WOF | WOF |
| 350 | No WOF, strong toasted flavor | No WOF, strong nutty flavor | WOF | WOF |
| 500 | No WOF, very strong toasted flavor | No WOF, very strong nutty flavor | WOF | WOF |

When 3,5-diethyl-1,2-cyclopentanedione (DECP) and 3,5-dimethyl-1,2-cyclopentanedione (DMCP) are used in place of ECP and MCP in the above procedure, no warmed-over flavor (WOF) is noted at any of the above use levels. Good flavor quality is found in those samples of meat containing 25 — 250 ppm. of these adjuncts, and levels of 50-150 ppm. appear to be optimal.

EXAMPLE 9

A 2200 gram sirloin tip beef roast is treated with 11.0 ml. of a 2% (w/v) solution of ECP in 5% ethanol; the solution of ECP being injected into the meat in 1 ml. portions at eleven different sites equally spaced around the roast. The meat, containing 100 ppm. ECP, is then roasted in an oven set at 325°F. (163°C.) until the roast is cooked medium-rare. The roast is allowed to cool slightly then sliced. The freshly sliced meat is judged to have excellent flavor. After cooling to room temperature, the slices are wrapped in aluminum foil and stored at 5°C. overnight. The next day slices which are rewarmed were again judged to have excellent flavor, devoid of the characteristic warmed-over flavor. Slices rewarmed after storing as long as 7 days are still free of WOF.

A control roast with no adjunct, when treated in the same manner, is judged to have WOF after storing the slices overnight at 5°C.

When lamb roast, pork roast and turkey are used in place of beef roast, the results are substantially unchanged.

EXAMPLE 10

An untreated beef roast is cooked in the oven until done, then weighed and treated by injecting a solution of ECP in 5% ethanol into the warm roast at various sites around the roast such that the meat contains 100 ppm. 3-ethyl-2-hydroxy-2-cyclopentenone (ECP). Upon treating as described in Example 9, the rewarmed slices of meat are free of WOF and have good flavor with no undesirable notes.

A separate beef roast, treated in the same manner with solvent (5% ethanol) blank only, is judged to have characteristic WOF.

When lamb roast, pork roast or turkey are used in place of beef roast the results are unchanged.

When MCP, DECP or DMCP is used in place of ECP in the above procedure, the results are substantially unchanged.

EXAMPLE 11

The procedure of Example 1 is repeated except that the adjuncts are added to the meat as a dry mix, with either soya protein or bread crumbs as diluent, in place of 5% ethanol. The results are substantially unchanged.

EXAMPLE 12

Fresh flounder fillets, codfish fillets and eviscerated mackerel are dusted with wheat flour containing MCP such that the fish contains 100 ppm. by weight of MCP. The fish are then broiled in the oven until done. Control samples of each fish with no adjunct are treated in the same manner. After removing from the oven, portions of each are found to have normal taste and aroma. The remaining portions are allowed to cool to room temperature, then wrapped in aluminum foil and stored at 5%C. overnight. The next day the fish portions were rewarmed. Those containing MCP were judged to have a freshly cooked flavor. The controls in each case were judged to have an inferior warmed-over flavor.

When the above is repeated with ECP at 50 ppm. in place of MCP at 100 ppm., the results are substantially the same.

EXAMPLE 13

When the procedure of Example 12 is repeated but instead of applying the adjuncts mixed with wheat flour, the MCP or ECP are applied in solution in 5% ethanol as solvent and either injecting the adjunct solution into the fish or applying the solution of adjunct to the surface of the fish, the results are substantially unchanged.

What is claimed is:

1. An improved method for inhibiting the development of warmed-over flavor in uncured meat, which comprises adding to the uncured meat from about 25 to 250 parts by weight per million parts by weight of meat of a compound of formula (I):

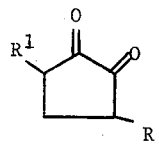

(I)

wherein R is selected from the group consisting of methyl and ethyl; and $R^1$ is selected from the group consisting of hydrogen, methyl and ethyl.

2. An improved method for inhibiting the development of warmed-over flavor in uncured cooked meats which comprises the steps of:
   a. adding to the uncured meat from about 25 to 250 parts by weight per million parts by weight of meat of a compound of formula (I):

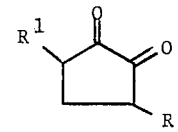

(I)

wherein R is selected from the group consisting of methyl and ethyl; and
   $R^1$ is selected from the group consisting of hydrogen, methyl and ethyl;
   b. cooking said meat;
   c. cooling said meat to a temperature below about 10°C.;
   d. storing said meat with said compound incorporated therein for at least 20 minutes at a temperature above the freezing point of the meat.

3. A method according to claim 1 wherein the amount of said compound of formula (I) employed is from about 50 to 150 parts by weight per million parts by weight of said meat.

4. A method according to claim 2 wherein after said storing for at least 20 minutes at a temperature above the freezing point of the meat, said meat is stored further at a temperature below the freezing point of the meat for periods of up to four weeks.

5. A method according to claim 2 wherein said compound of formula (I) is added to said meat before said cooking.

6. A method according to claim 2 wherein said compound of formula (I) is added to said meat after said cooking.

7. A method according to claim 1 wherein said meat is ground and said compound of formula (I) is mixed with the ground meat.

8. A method according to claim 7 wherein said meat is ground beef.

9. A method according to claim 1 wherein said compound of formula (I) in undiluted form is added to said meat.

10. A method according to claim 1 wherein said compound of formula (I) in diluted form is added to said meat.

11. A method according to claim 10 wherein said diluted form is injected into said meat.

12. A method according to claim 1 wherein said compound of formula (I) is 3-methyl-1,2-cyclopentanedione.

13. A method according to claim 1 wherein said compound of formula (I) is 3-ethyl-1,2-cyclopentanedione.

14. A method according to claim 2 wherein after said storing said meat is reheated to a temperature above about 32°C.

* * * * *